United States Patent
Wu et al.

(10) Patent No.: US 11,099,977 B1
(45) Date of Patent: Aug. 24, 2021

(54) METHOD, DEVICE AND COMPUTER-READABLE STORAGE MEDIUM FOR TESTING BIOS USING MENU MAP OBTAINED BY PERFORMING IMAGE IDENTIFICATION ON BIOS INTERFACE

(71) Applicant: EMC IP Holding Company LLC, Hopkinton, MA (US)

(72) Inventors: Heshi Wu, Shanghai (CN); Guowu Xia, Shanghai (CN); Zhi Feng, Shanghai (CN); Xiaoxia Shu, Shanghai (CN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/823,921

(22) Filed: Mar. 19, 2020

(30) Foreign Application Priority Data

Feb. 6, 2020 (CN) .......................... 202010081704.1

(51) Int. Cl.
*G06F 11/00* (2006.01)
*G06F 11/36* (2006.01)

(52) U.S. Cl.
CPC .................. *G06F 11/3688* (2013.01)

(58) Field of Classification Search
CPC .................................................. G06F 11/3688
See application file for complete search history.

(56) References Cited

U.S. PATENT DOCUMENTS

| | | | | |
|---|---|---|---|---|
| 7,467,134 B2* | 12/2008 | Bayiates | ................. | G06F 16/58 |
| 7,698,546 B2* | 4/2010 | Stamen | ................. | G06F 9/4411 713/2 |
| 7,917,809 B2* | 3/2011 | Cao | ......................... | G06F 11/26 714/32 |
| 8,522,005 B2* | 8/2013 | Mahmoud | ............. | G06F 9/4413 713/100 |
| 8,578,190 B2* | 11/2013 | Yoshioka | ............ | G06F 11/2284 713/310 |
| 9,003,001 B2* | 4/2015 | Dvorkin | .............. | G06F 9/44505 709/222 |
| 9,558,016 B2* | 1/2017 | Cho | ...................... | G06F 9/4401 |
| 10,120,671 B1* | 11/2018 | Li | ....................... | G06F 9/45545 |
| 10,268,628 B2* | 4/2019 | Chuang | ................. | G06F 21/575 |
| 2005/0198487 A1* | 9/2005 | Zimmer | ................ | G06F 9/4411 713/2 |
| 2012/0260077 A1* | 10/2012 | Harmer | ................... | G06F 9/451 713/1 |
| 2018/0150302 A1* | 5/2018 | Chuang | ................. | G06F 21/575 |

OTHER PUBLICATIONS

Wikipedia, "BIOS," https://en.wikipedia.org/wiki/BIOS, Mar. 9, 2020, 22 pages.

* cited by examiner

*Primary Examiner* — Elmira Mehrmanesh
(74) *Attorney, Agent, or Firm* — Ryan, Mason & Lewis, LLP

(57) ABSTRACT

Embodiments of the disclosure relate to a method, a device, and a computer-readable storage medium for testing a basic input output system (BIOS). The method comprises: acquiring a target attribute of a target menu of a BIOS of a test machine; determining a path to the target menu based on a menu map of the BIOS, wherein the menu map is obtained by performing image identification on a BIOS interface of the test machine; and causing the BIOS of the test machine to enter the target menu based on the path so as to modify the attribute of the target menu into the target attribute.

20 Claims, 4 Drawing Sheets ered to the processor, or the like. Device 400 includes central processing unit, memory, drawings. Although illustrative embodiments
METHOD, DEVICE AND COMPUTER-READABLE STORAGE MEDIUM FOR TESTING BIOS USING MENU MAP OBTAINED BY PERFORMING IMAGE IDENTIFICATION ON BIOS INTERFACE

RELATED APPLICATION(S)

The present application claims priority to Chinese Patent Application No. 202010081704.1, filed Feb. 6, 2020, and entitled "Method, Device and Computer-Readable Storage Medium for Testing BIOS," which is incorporated by reference herein in its entirety.

FIELD

Embodiments of this disclosure relate to instances of a basic input output system (BIOS), and more particularly to a method, a device, and a computer program product for testing a BIOS.

BACKGROUND

A large number of computer devices boot up with the BIOS running. At present, BIOS-related functions are often manually tested, that is, attributes are manually configured, and then the device is restarted to see if the functions work well.

Testing and debugging are expensive in both time and economy. A very small BIOS may contain hundreds of functions. Testing all physical devices that must be restarted multiple times is very challenging. Another difficulty is how to find the right menu, which is usually done by searching for technical documents or by moving a button. Therefore, it is necessary to provide a technical solution that at least partially solves the foregoing problems in the prior art.

SUMMARY

Embodiments of this disclosure provide a method, a device, a computer-readable storage medium, and a computer program product for testing a BIOS.

In a first aspect, a method for testing a BIOS is provided. The method comprises: acquiring a target attribute of a target menu of a BIOS of a test machine; determining a path to the target menu based on a menu map of the BIOS, wherein the menu map is obtained by performing image identification on a BIOS interface of the test machine; and entering the target menu based on the path so as to modify the attribute of the target menu into the target attribute.

In a second aspect, an electronic device is provided. The device comprises: a processing unit; and a memory coupled to the processing unit and comprising instructions stored thereon, wherein when executed by the processing unit, the instructions cause the device to perform actions, the actions comprising: acquiring a target attribute of a target menu of a BIOS of a test machine; determining a path to the target menu based on a menu map of the BIOS, wherein the menu map is obtained by performing image identification on a BIOS interface of the test machine; and entering the target menu based on the path so as to modify the attribute of the target menu into the target attribute.

In a third aspect, a computer-readable storage medium having machine-executable instructions stored thereon is provided, wherein when executed by at least one processor, the machine-executable instructions cause the at least one processor to implement the method according to the first aspect.

In a fourth aspect, a computer program product stored on a computer-readable medium and comprising machine-executable instructions is provided, wherein when executed, the machine-executable instructions cause a machine to implement the method according to the first aspect.

This Summary is provided to introduce the selection of concepts in a simplified form, which will be further described in the detailed description below. The Summary is neither intended to identify key features or main features of the present disclosure, nor intended to limit the scope of the present disclosure.

BRIEF DESCRIPTION OF THE DRAWINGS

The foregoing and other objectives, features, and advantages of this disclosure will become more apparent from more detailed description of the example embodiments of this disclosure in conjunction with the accompanying drawings. In the example embodiments of this disclosure, identical reference numerals usually represent identical components.

DETAILED DESCRIPTION

Illustrative embodiments of this disclosure will be described in more detail hereinafter with reference to the accompanying drawings. Although illustrative embodiments of this disclosure are shown in the accompanying drawings, it should be understood that this disclosure can be implemented in a variety of forms and should not be limited by the embodiments set forth herein. But rather, these embodiments are provided so that this disclosure is more thorough and complete, and the scope of this disclosure can be fully conveyed to those skilled in the art.

As used herein, the term "include/comprise" and the variations thereof mean open inclusion, i.e., "including/comprising but not limited to." Unless specifically stated, the term "or" means "and/or." The term "based on" means "based at least in part on." The terms "one example embodiment" and "one embodiment" mean "at least one example embodiment." The term "another embodiment" means "at least one additional embodiment." The terms "first," "second" and the like may refer to different or identical objects. Other explicit and implicit definitions may also be included below.

Figure 1:
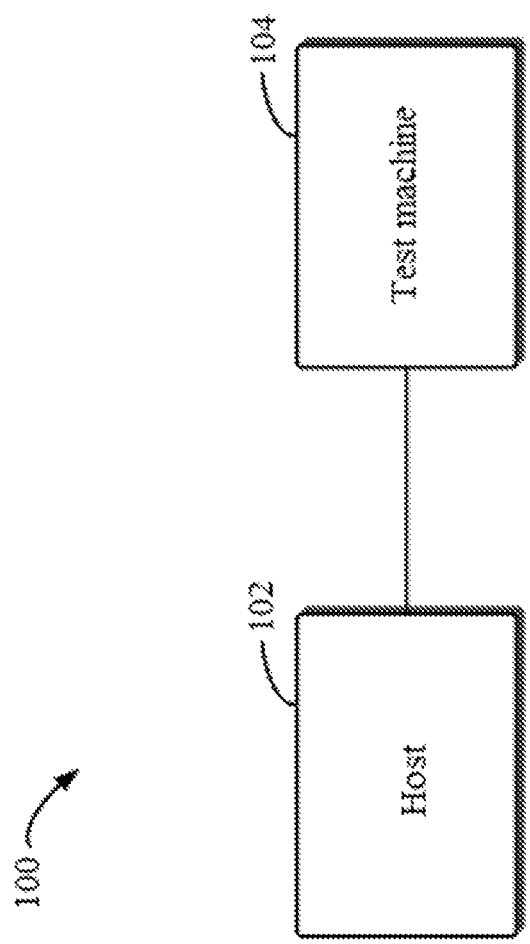
FIG. 1 shows a schematic diagram of a test environment according to some embodiments of the present disclosure.

FIG. 1 shows a schematic diagram of test environment 100 according to some embodiments of the present disclosure. As shown in FIG. 1, host 102 and test machine 104 are in communication with one another via at least one connection. For example, they can be in communication via a connection through an interface such as a serial port, a network interface, etc. Although FIG. 1 shows only one test machine 104, it should be understood that host 102 can support a large number of test machines.

Host 102 may send an instruction to test machine 104 to control the BIOS operation of test machine 104. For example, host 102 may send an instruction to test machine 104 through a serial port so as to control how to move the position of a cursor on a BIOS interface of test machine 104. In addition, host 102 may receive an image of the BIOS interface from test machine 104 through a network interface or one or more other suitable interfaces for image identification. Through image identification, host 102 may obtain the menu distribution on the BIOS interface and construct a menu map of the BIOS of test machine 104.

After the menu map of the BIOS of test machine 104 is constructed, the menu map can be used to find a target menu when the BIOS is configured or tested. For example, the shortest path method can be used to find the shortest path to the target menu, and an instruction corresponding to the shortest path can be used to enter the target menu of the BIOS and to modify the target menu.

Figure 2:
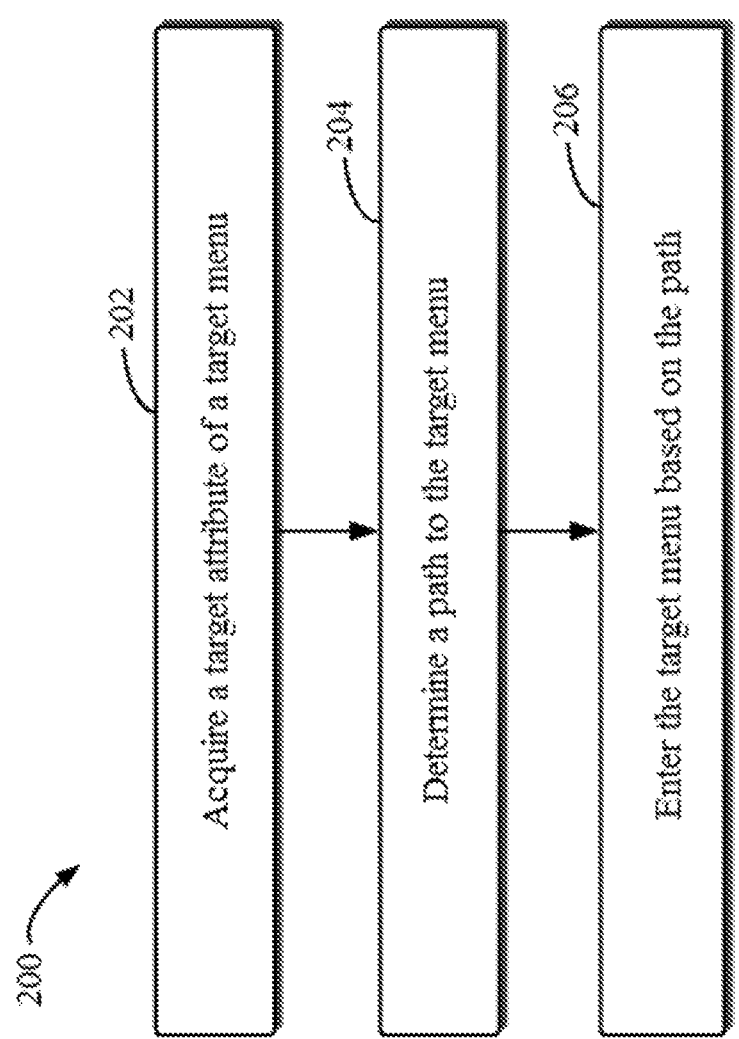
FIG. 2 shows a flowchart of a method for configuring a BIOS according to some embodiments of the present disclosure.

FIG. 2 shows a flowchart of method 200 for testing a BIOS according to some embodiments of the present disclosure. Method 200 may be applied to test environment 100 shown in FIG. 1 and may be implemented by host 102.

At block 202, host 102 acquires a target attribute of the target menu of the BIOS of test machine 104. For example, the target menu may be either a menu in a main interface of the BIOS or a menu in a sub-interface associated with a corresponding menu.

Figure 3:
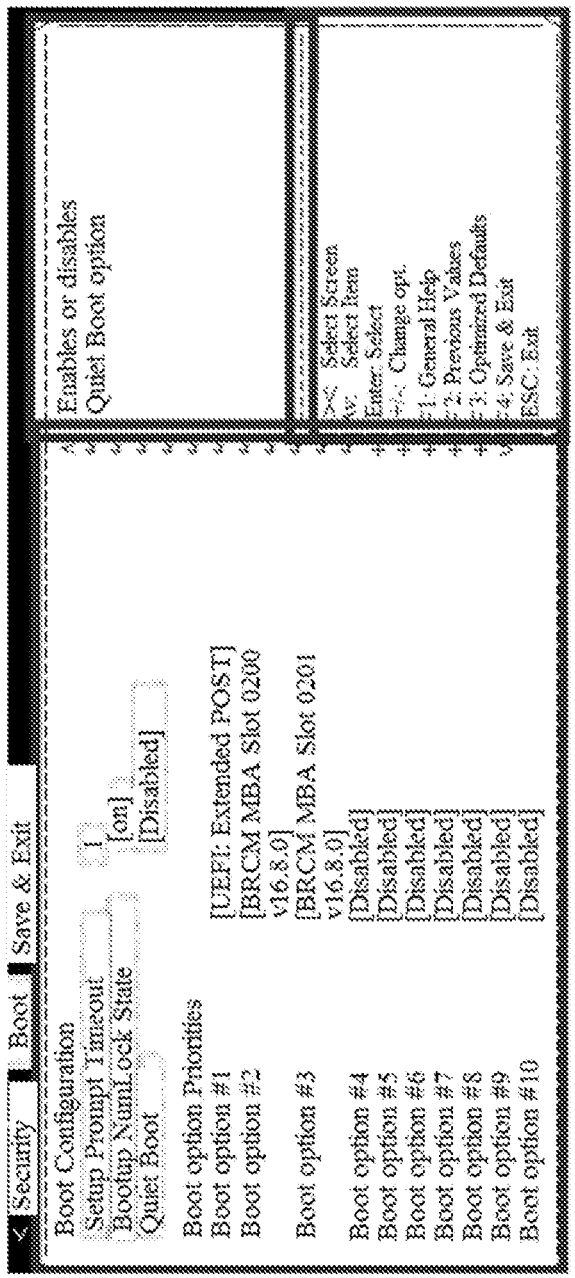
FIG. 3 shows a schematic diagram of a BIOS interface according to some embodiments of the present disclosure.

FIG. 3 shows a schematic diagram of a BIOS interface according to some embodiments of the present disclosure, in which a sub-interface of the BIOS is shown. For example, the target menu may be "Quiet Boot" in FIG. 3, and the attribute of the target menu is "Disabled," whereas the target attribute may be "Enabled."

At block 204, based on the menu map of the BIOS, host 102 determines a path to the target menu, wherein the menu map is obtained by performing image identification on the BIOS interface of test machine 104. For example, in the example of FIG. 3, the path to the target menu "Quiet Boot" can be determined from the menu map of the BIOS. This path describes how to enter the target menu "Quiet Boot" or its attributes from the main interface step by step so as to modify the attribute of the target menu. For example, the path to the target menu can be determined by means of a shortest path search algorithm.

In some embodiments, host 102 sends an instruction to test machine 104 so as to enter the BIOS interface of test machine 104. The BIOS interface may correspond to the main interface of the BIOS or a sub-interface associated with a corresponding menu. Then, host 102 acquires an image of the BIOS interface from test machine 104, and determines menus in the BIOS interface by identifying the image of the BIOS interface. Host 102 may iteratively perform the above operations until all BIOS interfaces of test machine 104 are identified.

For example, image identification can be performed through dichotomy. Specifically, an image of the BIOS interface may be divided into grids, and a binarized representation of the image may be obtained according to whether there is a character in each grid. For example, if there is a character in a grid, the value of the grid is set to 1, otherwise, the value of the grid is set to 0. Generally speaking, the grids are divided relatively finely, so that a letter can be split into a number of grids, thereby making it easy to identify accurately. Based on binarized representations of these images, various menus in the BIOS interface can be determined.

Alternatively, image identification may also be performed by means of a machine learning method such as neural networks to acquire various menus of the BIOS interface.

The above-described image identification to acquire menus of the BIOS interface can be used for various BIOS systems without specialized design for a particular BIOS system. In addition, this way of acquiring the menu map can be completed at one time and can be reused later, which is particularly suitable for large-scale computer clusters.

At block 206, host 102 causes the BIOS of test machine 104 to enter the target menu based on the path so as to modify the attribute of the target menu into the target attribute. For example, host 102 may send an instruction to test machine 104 through a serial port so as to execute an instruction corresponding to the path. In the example of FIG. 3, it is possible to enter the target menu "Quiet Boot" according to the path to the target menu, and modify the attribute of the target menu "Quiet Boot" into the target attribute "Enabled."

After the BIOS is configured, test machine 104 can be restarted for verification. In this way, fully-automated testing can be achieved.

According to embodiments of the present disclosure, the technical solution can be applied to various scenarios where a BIOS is used and has no preference for the type of the BIOS. Both testers and customers can easily use this test method.

Figure 4:
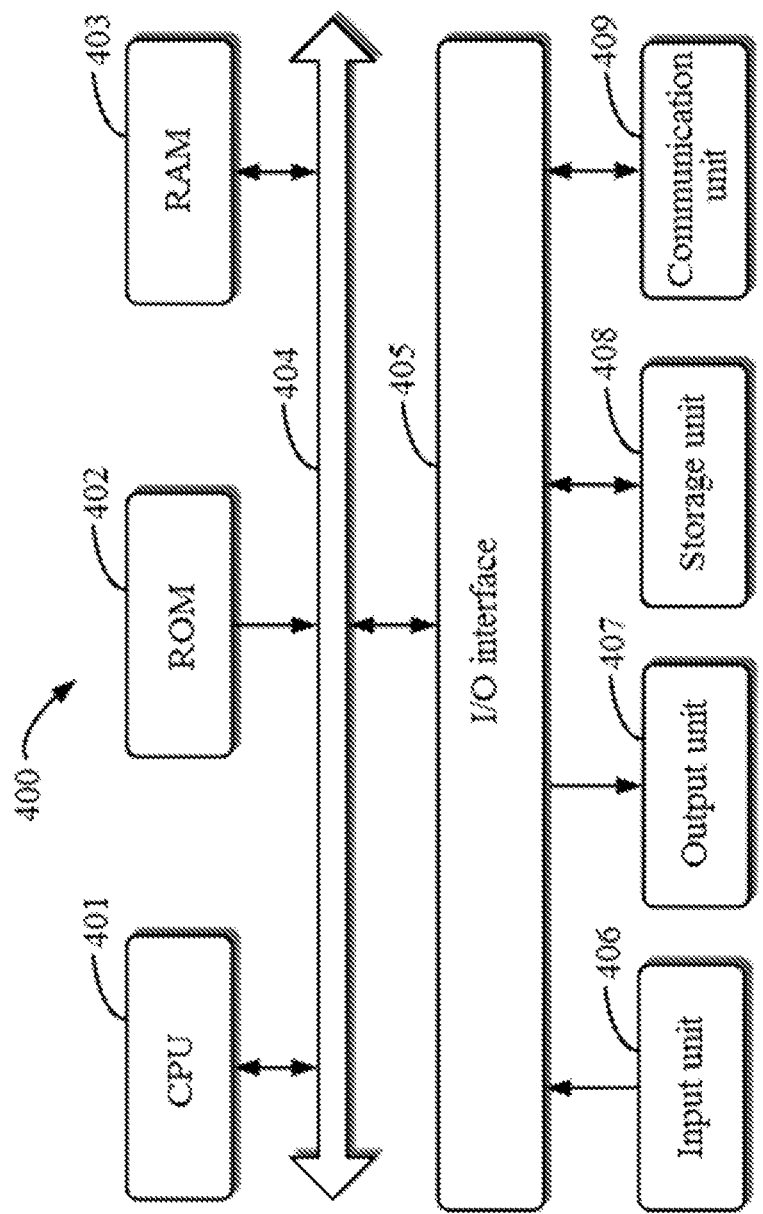
FIG. 4 shows a schematic block diagram of an example device that can be used to implement embodiments of this disclosure according to some embodiments of this disclosure.

FIG. 4 shows a schematic block diagram of device 400 that can be used to implement embodiments of the present disclosure. As shown in FIG. 4, device 400 includes central processing unit (CPU) 401 that can perform various appropriate actions and processing according to computer program instructions stored in read-only memory (ROM) 402 or computer program instructions loaded into random access memory (RAM) 403 from storage unit 408. In RAM 403, various programs and data required for the operation of device 400 can also be stored. CPU 401, ROM 402, and RAM 403 are connected to each other via bus 404. Input/output (I/O) interface 405 is also connected to bus 404.

A plurality of components in device 400 are connected to I/O interface 405, including: input unit 406, e.g., a keyboard, a mouse, etc.; output unit 407, e.g., various types of displays, speakers, etc.; storage unit 408, e.g., a magnetic disk, an optical disk, etc.; and communication unit 409, e.g., a network card, a modem, a wireless communication transceiver, etc. Communication unit 409 allows device 400 to exchange information/data with other devices over a computer network such as the Internet and/or various telecommunication networks.

Various processes and processing described above, e.g., method 200, can be performed by CPU 401. For example, in some embodiments, method 200 can be implemented as a computer software program that is tangibly contained in a machine-readable medium, e.g., storage unit 408. In some embodiments, some or all of the computer program may be loaded and/or installed onto device 400 via ROM 402 and/or communication unit 409. When the computer programs are loaded onto RAM 403 and executed by CPU 401, one or more steps of method 200 described above may be performed.

Illustrative embodiments of the disclosure comprise a method, an apparatus, a system, and/or a computer program product. The computer program product may include a computer-readable storage medium on which computer-readable program instructions for implementing various aspects of this disclosure are loaded.

The computer-readable storage medium may be a tangible device that can hold and store instructions used by an instruction-executing device. The computer-readable storage medium may be, for example but not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, RAM, ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device, such as a punch card or a protruding structure within a groove on which instructions are stored, and any suitable combination of the above. The computer-readable storage medium used herein is not to be interpreted as transient signals per se, such as radio waves or other freely propagating electromagnetic waves, electromagnetic waves propagated through waveguides or other transmission media (e.g., light pulses propagated through fiber optic cables), or electrical signals transmitted through electrical wires.

The computer-readable program instructions described herein can be downloaded from the computer-readable storage medium to various computing/processing devices, or downloaded to an external computer or an external storage device over a network, e.g., the Internet, a local area network, a wide area network, and/or a wireless network. The network may include copper transmission cables, fiber optic transmission, wireless transmission, routers, firewalls, switches, gateway computers, and/or edge servers. The network adapter cards or network interfaces in various computing/processing devices receive computer-readable program instructions from the network and forward the computer-readable program instructions for storage in the computer-readable storage media in various computing/processing devices.

The computer program instructions for performing the operations of this disclosure may be assembly instructions, instruction set architecture (ISA) instructions, machine instructions, machine-related instructions, microcode, firmware instructions, status setting data, or source code or object code written in any combination of one or more programming languages. The programming languages include object-oriented programming languages (such as Smalltalk, C++, etc.) and conventional procedural programming languages (such as the "C" language or similar programming languages). The computer readable program instructions can be completely executed on a user's computer, partially executed on a user's computer, executed as a separate software package, partially executed on a user's computer and partially executed on a remote computer, or completely executed on a remote computer or a server. In cases involving a remote computer, the remote computer can be connected to a user's computer over any kind of networks, including a local area network (LAN) or a wide area network (WAN), or alternatively it can be connected to an external computer (e.g., over the Internet provided by an Internet service provider). In some embodiments, an electronic circuit, for example, a programmable logic circuit, a field programmable gate array (FPGA), or a programmable logic array (PLA) is customized by utilizing state information of the computer-readable program instructions. The electronic circuit may execute the computer-readable program instructions to implement various aspects of the present disclosure.

Various aspects of this disclosure are described herein with reference to flowcharts and/or block diagrams of the method, apparatus (system) and computer program product according to the embodiments of this disclosure. It should be understood that each block of the flowcharts and/or block diagrams, and the combinations of various blocks in the flowcharts and/or block diagrams can be implemented by computer-readable program instructions.

These computer-readable program instructions can be provided to a processing unit of a general-purpose computer, a special-purpose computer, or another programmable data processing apparatus, thereby producing a machine such that, when these instructions are executed by the processing unit of the computer or another programmable data processing apparatus, an apparatus for implementing functions/actions specified in one or more blocks of the flowcharts and/or block diagrams is produced. These computer-readable program instructions may also be stored in a computer-readable storage medium, and these instructions cause a computer, a programmable data processing apparatus and/or another device to work in a specific manner. Therefore, the computer-readable medium storing the instructions includes an article of manufacture that includes instructions for implementing various aspects of the functions/actions specified in one or more blocks of the flowcharts and/or block diagrams.

The computer-readable program instructions may also be loaded onto a computer, another programmable data processing apparatus, or another device, such that a series of operation steps are performed on the computer, another programmable data processing apparatus, or another device to produce a computer-implemented process. Therefore, the instructions executed on the computer, another programmable data processing apparatus, or another device implement the functions/actions specified in one or more blocks of the flowcharts and/or block diagrams.

The flowcharts and block diagrams in the accompanying drawings show the architecture, functions, and operations of possible implementations of the system, method and computer program product according to a plurality of embodiments of the present disclosure. In this regard, each block in the flowcharts or block diagrams may represent a module, a program segment, or a part of instructions, which contains one or more executable instructions for implementing specified logical functions. In some alternative implementations, the functions labeled in the blocks may also occur in an order different from that labeled in the drawings. For example, two consecutive blocks may actually be implemented substantially in parallel, and sometimes they may also be implemented in a reverse order, depending on the functions involved. It should also be noted that each block in the block diagrams and/or flowcharts, and the combinations of blocks in the block diagrams and/or flowcharts can be implemented with a dedicated hardware-based system that performs the specified functions or actions, or with a combination of dedicated hardware and computer instructions.

Although various embodiments of this disclosure have been described above, the above description is exemplary but not exhaustive, and is not limited to various embodiments disclosed. Many modifications and variations will be apparent to a person of ordinary skill in the art without departing from the scope and spirit of various embodiments described. The terms used herein are chosen to best explain the principles, practical applications of various embodiments or the technical improvements to technologies in the market, so as to enable a person of ordinary skill in the art to understand various embodiments disclosed herein.

What is claimed is:

1. A method for testing a basic input output system (BIOS) of a test machine, comprising:
   acquiring a target attribute of a target menu of the BIOS of the test machine;
   determining a path to the target menu based on a menu map of the BIOS, wherein the menu map is obtained by performing image identification on a BIOS interface of the test machine; and
   causing the BIOS of the test machine to enter the target menu based on the path so as to modify the attribute of the target menu into the target attribute.

2. The method according to claim 1, wherein the path to the target menu is the shortest path.

3. The method according to claim 1, wherein causing the BIOS of the test machine to enter the target menu comprises:
   sending, through a serial port, an instruction corresponding to the path so as to enter the target menu.

4. The method according to claim 1, wherein the menu map is determined by iteratively performing the following operations:
   sending instructions to the test machine so as to enter the BIOS interface of the test machine, the BIOS interface corresponding to a main interface of the BIOS or a sub-interface associated with a corresponding menu;
   acquiring an image of the BIOS interface from the test machine; and
   determining menus in the BIOS interface by identifying the image of the BIOS interface.

5. The method according to claim 1, wherein the image identification comprises:
   dividing an image of the BIOS interface into grids;
   obtaining a binarized representation of the image based on whether there is a character in a grid; and
   determining menus in the BIOS interface based on the binarized representation of the image.

6. The method according to claim 1, wherein the menu map is determined at least in part by applying a machine learning algorithm to an image of the BIOS interface to recognize at least portions of one or more menus in the image of the BIOS interface.

7. The method according to claim 6, wherein the machine learning algorithm comprises at least one neural network.

8. The method according to claim 1, wherein performing image identification on the BIOS interface of the test machine comprises:
   acquiring an image of the BIOS interface from the test machine; and
   recognizing at least portions of one or more menus in the image of the BIOS interface.

9. An electronic device, comprising:
   a processing unit; and a memory coupled to the processing unit and comprising instructions stored thereon, wherein when executed by the processing unit, the instructions cause the device to perform actions, the actions comprising:
   acquiring a target attribute of a target menu of a basic input output system (BIOS) of a test machine;
   determining a path to the target menu based on a menu map of the BIOS, wherein the menu map is obtained by performing image identification on a BIOS interface of the test machine; and
   causing the BIOS of the test machine to enter the target menu based on the path so as to modify the attribute of the target menu into the target attribute.

10. The electronic device according to claim 9, wherein the path to the target menu is the shortest path.

11. The electronic device according to claim 9, wherein causing the BIOS of the test machine to enter the target menu comprises:
   sending, through a serial port, an instruction corresponding to the path so as to enter the target menu.

12. The electronic device according to claim 9, wherein the menu map is determined by iteratively performing the following operations:
   sending instructions to the test machine so as to enter the BIOS interface of the test machine, the BIOS interface corresponding to a main interface of the BIOS or a sub-interface associated with a corresponding menu;
   acquiring an image of the BIOS interface from the test machine; and
   determining menus in the BIOS interface by identifying the image of the BIOS interface.

13. The electronic device according to claim 9, wherein the image identification comprises:
   dividing an image of the BIOS interface into grids;
   obtaining a binarized representation of the image based on whether there is a character in a grid; and
   determining menus in the BIOS interface based on the binarized representation of the image.

14. A computer-readable storage medium having machine-executable instructions stored thereon, wherein when executed by at least one processor, the machine-executable instructions cause the at least one processor to implement a method for testing a basic input output system (BIOS) of a test machine, comprising:
   acquiring a target attribute of a target menu of the BIOS of the test machine;
   determining a path to the target menu based on a menu map of the BIOS, wherein the menu map is obtained by performing image identification on a BIOS interface of the test machine; and
   causing the BIOS of the test machine to enter the target menu based on the path so as to modify the attribute of the target menu into the target attribute.

15. The computer-readable storage medium according to claim 14, wherein the path to the target menu is the shortest path.

16. The computer-readable storage medium according to claim 14, wherein causing the BIOS of the test machine to enter the target menu comprises:
   sending, through a serial port, an instruction corresponding to the path so as to enter the target menu.

17. The computer-readable storage medium according to claim 14, wherein the menu map is determined by iteratively performing the following operations:
   sending instructions to the test machine so as to enter the BIOS interface of the test machine, the BIOS interface corresponding to a main interface of the BIOS or a sub-interface associated with a corresponding menu;
   acquiring an image of the BIOS interface from the test machine; and
   determining menus in the BIOS interface by identifying the image of the BIOS interface.

18. The computer-readable storage medium according to claim 14, wherein the image identification comprises:
   dividing an image of the BIOS interface into grids;
   obtaining a binarized representation of the image based on whether there is a character in a grid; and determining menus in the BIOS interface based on the binarized representation of the image.

19. The computer-readable storage medium according to claim 14, wherein the menu map is determined at least in part by applying a machine learning algorithm to an image of the BIOS interface to recognize at least portions of one or more menus in the image of the BIOS interface.

20. The computer-readable storage medium according to claim 19, wherein the machine learning algorithm comprises at least one neural network.

* * * * *